United States Patent Office 3,447,074
Patented May 27, 1969

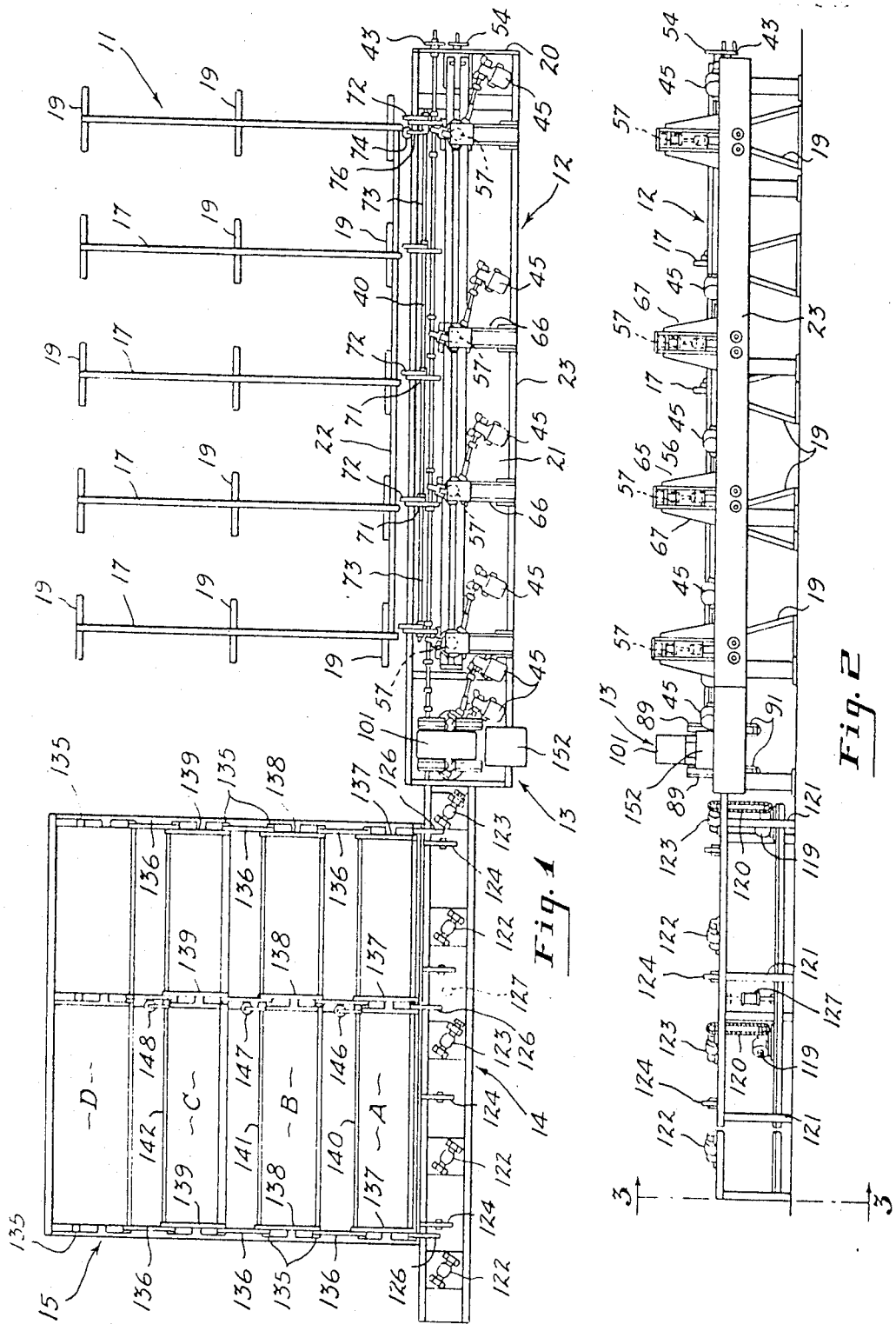

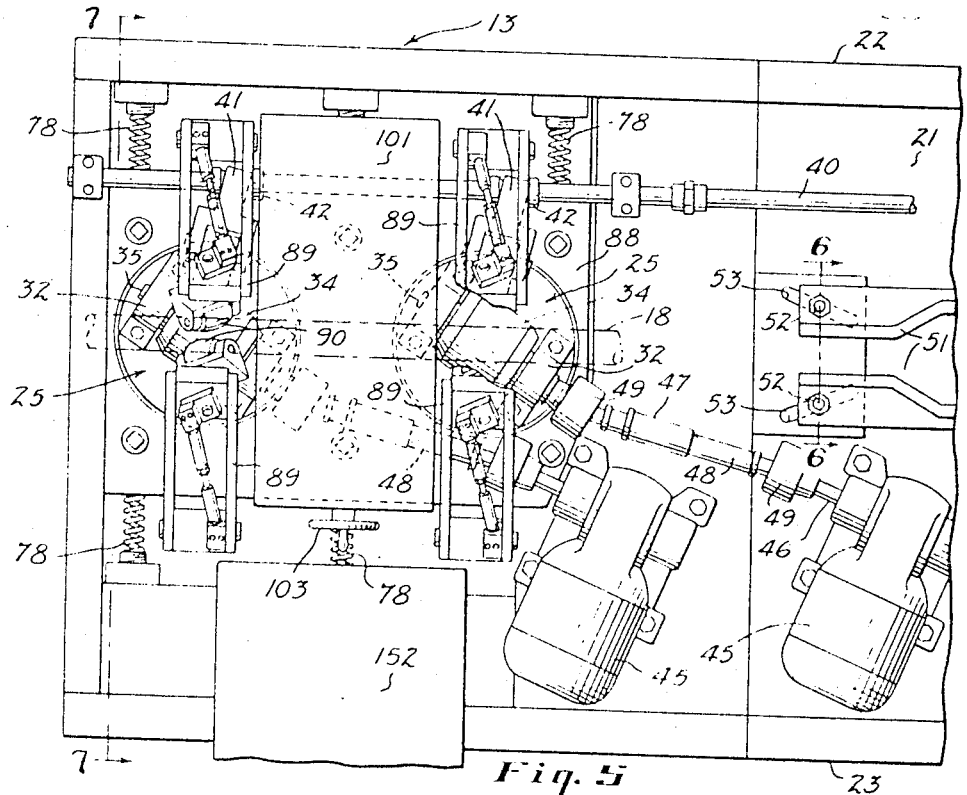
Fig. 5
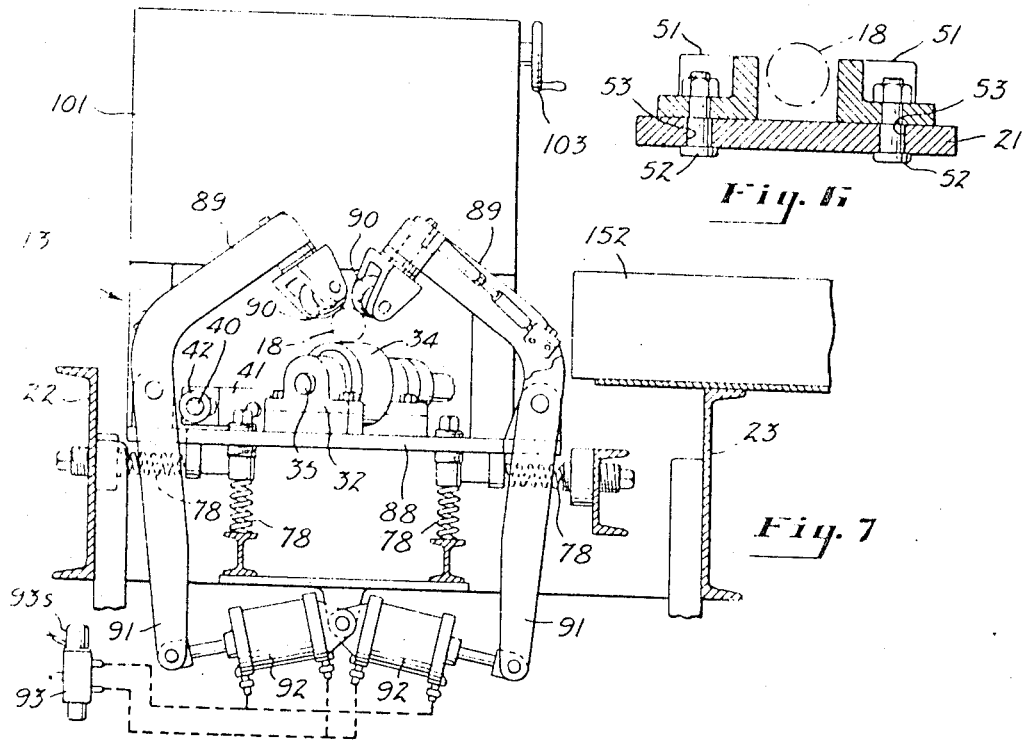
Fig. 6
Fig. 7

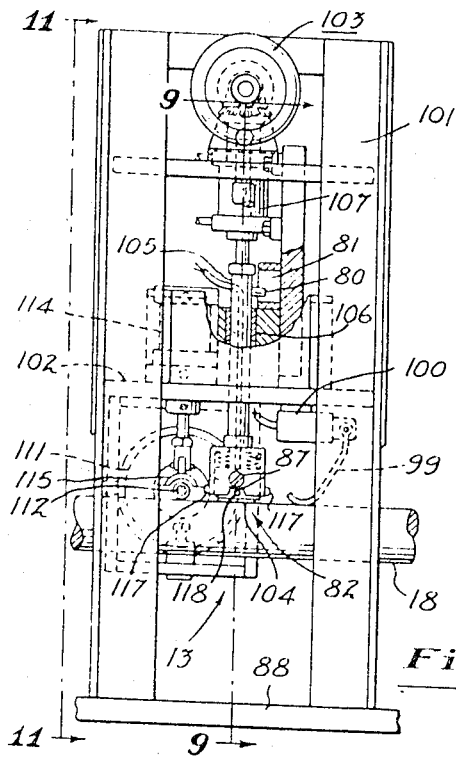
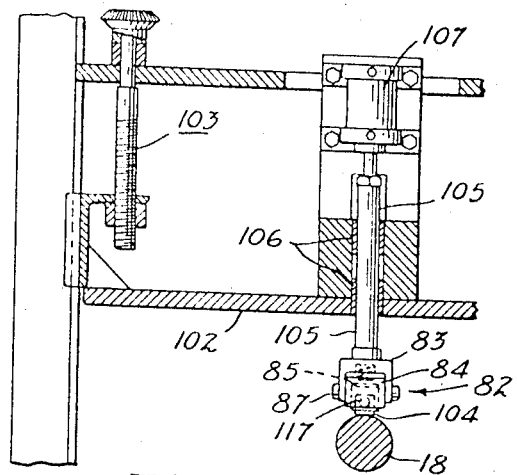
Fig.8
Fig.9
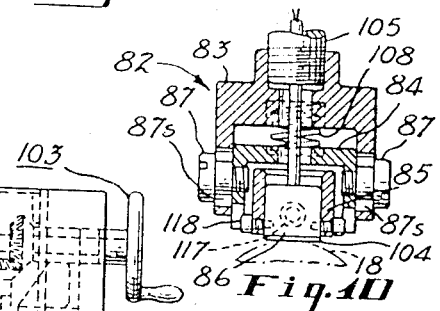
Fig.10
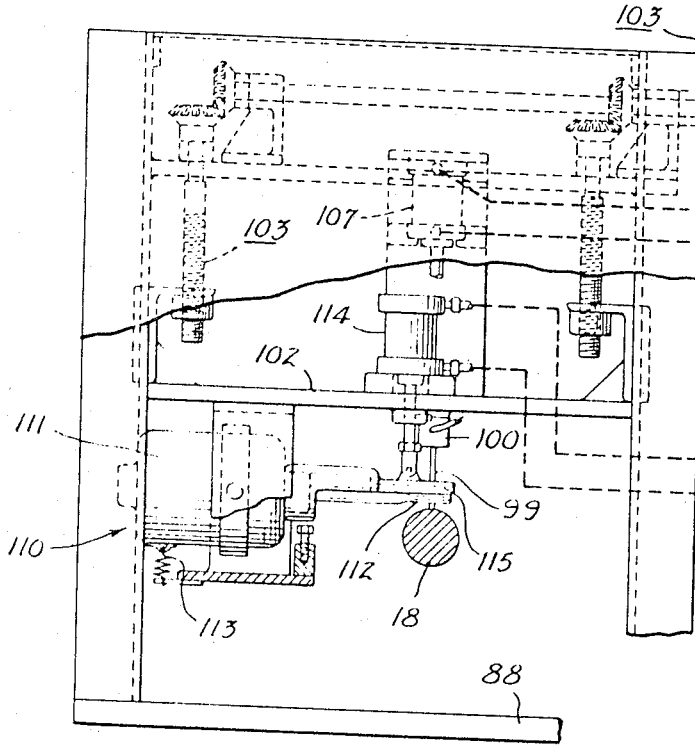
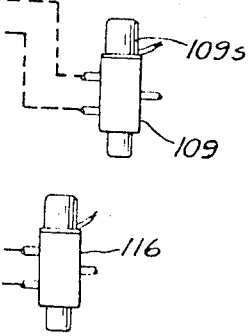
Fig.11

3,447,074
WORKPIECE INSPECTION APPARATUS IN WHICH SENSOR AND POWER-DRIVEN ROLLERS ARE MOUNTED ON YIELDABLE SUSPENSIONS
George W. Sower, Cleveland, and William C. Harmon, Chagrin Falls, Ohio, assignors to Republic Steel Corporation, Cleveland, Ohio, a corporation of New Jersey
Filed May 5, 1964, Ser. No. 365,130
Int. Cl. G01r 33/12; B65g 13/02
U.S. Cl. 324—37                                11 Claims

ABSTRACT OF THE DISCLOSURE

A plurality of aligned floating propelling assemblies individually supported on resilient biasing structure propel elongated workpieces through an inspection station for defect detection by a floating probe. The propelling assemblies include skewed drive rollers that are angularly adjustable.

---

The present invention relates to the inspection of workpieces for defects and relates more particularly to apparatuses for propelling elongated workpieces through an inspection station for defect detection.

The present apparatus is especially suited for propelling workpieces through an inspection station where defects are detected, their severity indicated, and the workpieces are classified as either "good," "salvageable," or "scrap." A suitable inspection system for such detection and classification is disclosed in a co-pending application Ser. No. 365,097, entitled, "Apparatus for Defect Analysis and Classification of Workpieces," by Tyler W. Judd and Joseph M. Mandula, Jr., now Patent No. 3,263,809. That application discloses a complete inspection system in which the workpieces are automatically taken from a stock pile, placed in an entrance section, propelled by the entrance section longitudinally through an inspection station, and then segregated into different groups of "good," "salvage" and "scrap" workpieces. The present invention is the entrance section and propelling system which is shown and described in the co-pending application.

Elongated metal bars are often bent or cambered. In the past this has caused great difficulty in defect inspection apparatuses. Even those workpieces classified by mill standards as "straight" may have as much as one quarter inch camber per five feet of length. Because of this camber even in the so-called "straight" workpieces, without the present invention it would be necessary to run each workpiece through a straightening apparatus prior to propelling it past a search probe in the inspection station.

In the present invention, the entrance section includes a plurality of longitudinally aligned propelling assemblies, each of which are individually supported on a resilient biasing structure so as to effectively float in the entrance section. The individual floating action of the propelling assemblies enables each to universally move independently of the other propelling assemblies so that the entrance section will propel workpieces which are bent and cambered and will properly introduce the workpieces into the inspection station. Thus, with the present invention, it is not necessary to first run the workpieces through a straightening apparatus prior to propelling them through the inspection station.

In the present invention, the inspection probe in the inspection station is attached to a probe positioner by a gimbal assembly. The gimbal assembly permits the probe to move universally to follow any movement of the workpiece. The gimbal assembly permits the probe to move relative to the probe-positioner and includes a resilient bias between the search probe and the probe positioner so that the search probe will float on the workpiece against a resilient bias. The floating probe and the floating propelling assemblies co-operate to provide a workpiece propelling and inspection system which will accommodate and accurately inspect workpieces which are bent and cambered.

In the system of the above-identified Patent No. 3,263,809 the elongated workpieces are rotated as well as longitudinally propelled past the inspection probe. This enables the inspection probe to examine the perimeter of the workpieces. If the amount of longitudinal travel per revolution is known and set at a value, it may be used as a basis to determine defect length and to classify the workpieces according to defect severity. In the present invention, each of the propelling assemblies includes a skewed drive rollar which rotates the elongated workpieces as well as driving them longitudinally. The skew angle of all of the rollers are adjustable to adjust the amount of longitudinal travel per revolution so that this fact is known and can be adjusted for several different sizes of workpieces.

Accordingly, it is one feature of the present invention to provide a new and improved apparatus for propelling a workpiece through an inspection station which propelling apparatus will accommodate elongated workpieces which are bent and cambered.

Another feature of the present invention is to provide a new and improved apparatus having a plurality of propelling assemblies wherein each assembly floats independently of the other assemblies.

Still another feature of the present invention is to provide a new and improved workpiece inspection apparatus for longitudinally propelling and simultaneously rotating an elongated workpiece through an inspection station.

Yet another feature of the present invention is to provide a new and improved apparatus for rotating and longitudinally propelling a workpiece through an inspection station wherein longitudinal travel per workpiece revolution is adjustable.

Yet a further feature of the present invention is to provide a new and improved inspection apparatus wherein the search probe assembly is universally movable to accommodate any movement of a rotating and longitudinally propelled workpiece and remains in resiliently biased contact with the workpiece.

Other features and a fuller understanding of the invention may be had by referring to the following description and claims taken in conjunction with the accompanying drawings in which:

FIGURE 1 is a top plan view of the workpiece classifying apparatus of the present invention.

FIGURE 2 is a front, elevational view of the workpiece classifying apparatus of FIGURE 1.

FIGURE 5 is a top plan view of the propelling assembly in the inspection station portion of the workpiece classifying apparatus shown in FIGURE 1.

FIGURE 6 is a section view taken along line 6—6 in FIGURE 5.

FIGURE 7 is an end, elevational view of the workpiece propelling assembly shown in FIGURE 5.

FIGURE 8 is an enlarged, front elevational view taken parallel to the path of workpiece travel of the inspection station of the classifying apparatus of FIGURE 1.

FIGURE 9 is a sectional view shown in elevation taken along line 9—9 in FIGURE 8.

FIGURE 10 is an enlarged elevation view, with parts in cross section, of the inspection probe assembly in the inspection station.

FIGURE 11 is a sectional view in elevation taken along line 11—11 in FIGURE 8.

Figure 3:
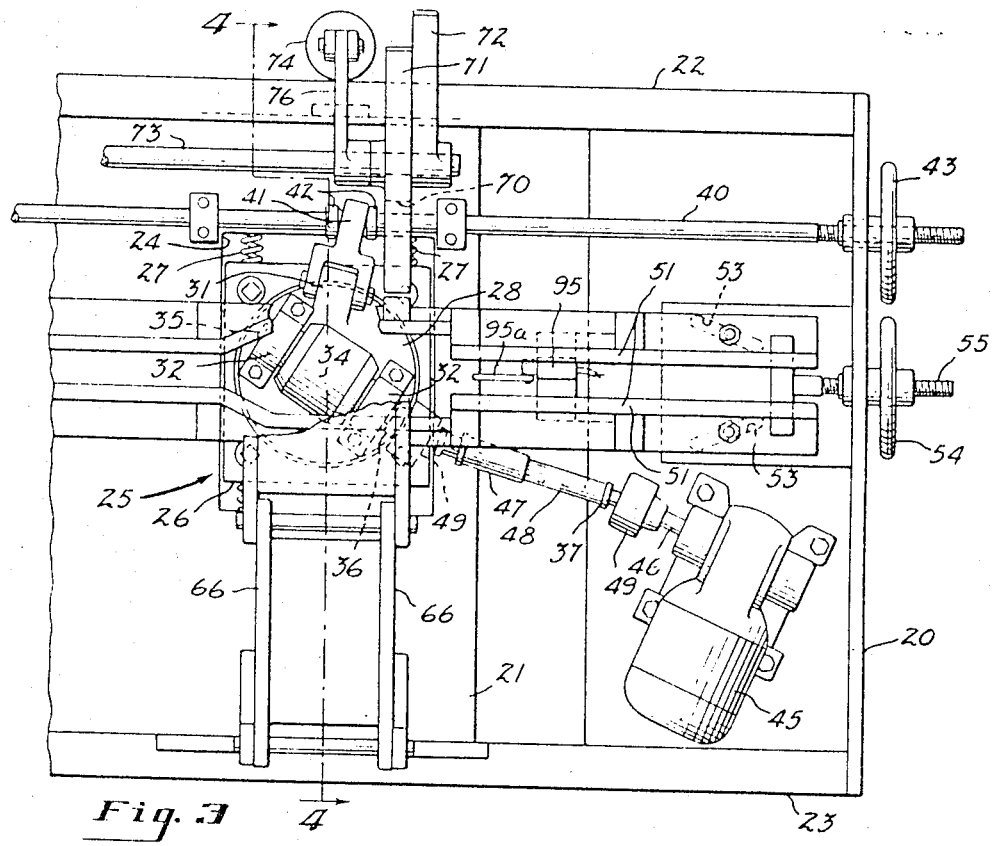
FIGURE 3 is an enlarged, top plan view, with parts broken away, of one of the propelling assemblies in the classifying apparatus of FIGURE 1.

Referring in particular to FIGURES 1 and 2, the automatic bar inspecting, defect marking and classifying system includes a workpiece storage and feed rack assembly 11, a workpiece entrance section 12, a workpiece inspection station 13, a workpiece exit section 14, and a workpiece segregating bin or cradle assembly 15. A control center 152 is disposed adjacent the inspection station 13 for controlling and co-ordinating the entrance section 12, the inspection station 13 the exit section 14 and the segregating bin assembly 15.

As shown in FIGURE 1, the workpiece feed rack assembly 11 comprises a plurality of spaced, inclined rack members 17 on which workpieces are stored and gravity fed towards the entrance section 12. Vertical support members 19 are provided to support the inclined rack members 17.

Referring to FIGURES 1-4, the entrance section 12 has a base 20 including a base plate 21 which is carried by horizontal channel members 22, 23. The base plate 21 has a plurality of rectangular openings 24 in which a plurality of workpiece propelling or drive assemblies 25 are mounted. There are four such propelling assemblies 25 in the entrance section 12 and two in the inspection station 13. Each propelling assembly 25 includes a rectagular float plate 26 which is carried by and floats on vertical and horizontal springs 27. A circular roller support table plate 28 has a center spindle projection 29 rotatably journaled in a center opening in the float plate 26. A turning arm 31 is fixed to the table plate 28 and projects outwardly beyond the float plate 26.

A pair of pillow blocks 32 are secured to the roller table 28. A roller 34 is disposed between the pillow blocks 32 and is carried by a shaft 35 which is rotatably journaled in the pillow blocks 32. The shaft 35 includes an extended shaft portion 36 which extends past one pillow block 32 and is connected to an extensible drive shaft 37. The roller 34, which may be metal, rubber or other suitable material, is fixed to the shaft 35 and is driven by it. The axes of rotation of the rollers 34 of all the propelling assemblies 25 are set at a predetermined angle relative to the line of travel of the workpieces 18 through the entrance section 12 and the inspection station 13. This angle, predetermined by the diameter of the workpieces, is changeable to adjustably control helical travel of the workpiece through the inspection station.

An adjusting rod 40 extends the length of the entrance section 12 and is pivotally connected to each of the turning arms 31 by fork shaped arm links 41 and shoulders 42 on the rod 40. An adjusting wheel 43 is rotatably carried by the base plate 21 and is threaded on one end of the adjusting rod 40 so that rotation of the adjusting wheel 43 causes the adjusting rod 40 to move longitudinally relative to the entrance section 12 and thus, simultaneously turns all of the roller tables 28 to adjust the skew angle of the rollers 34 in the entrance section 12 and in the inspection station 13.

Motors 45 are secured to the bases of the entrance section 12 and the inspection station 13 near each propelling assembly 25 and include drive shafts 46 which are coupled to the extended shaft portions 36 of the roller shafts 35 and drive them through the extensible drive shafts 37. The extensible drive shafts 37 include internally and externally splined members 47, 48 respectively which telescope to accommodate for changes in the distances between the rollers 34 and the motor shafts 46 when the skew angle of the rollers 34 is changed by the adjusting wheel 43. The extensible shafts 37 are coupled on each end to the roller and motor shafts 35, 46 by universal couplings 49 to accommodate non-alignment of the roller and motor shafts 35, 46.

Guide members 51 are carried by the base plate 21, and are disposed in spaced parallel relation on each side of the path of travel of the workpiece 18. The guide members 51 extend throughout the entrance section 12 and are movable laterally to adjust for various widths of workpieces. The spacing between the guide members is preferably set one and a half times the diameter of the workpiece by an adjusting wheel 54. The adjusting wheel 54 is rotatably carried by the base 20 and is threaded on a rod 55. The rod 55 is connected to the guide members 51 and longitudinally moves the guide members when the adjustment wheel 54 is rotated. Camming bolts 52 are fixed to the guide members 51 and are slidably disposed in diverging camming slots 53 in the base plate 21. When the guide members 51 are caused to move longitudinally, the coaction of the camming bolts 52 and the camming slots 53 adjusts the spacing between the guide members 51.

Figure 4:
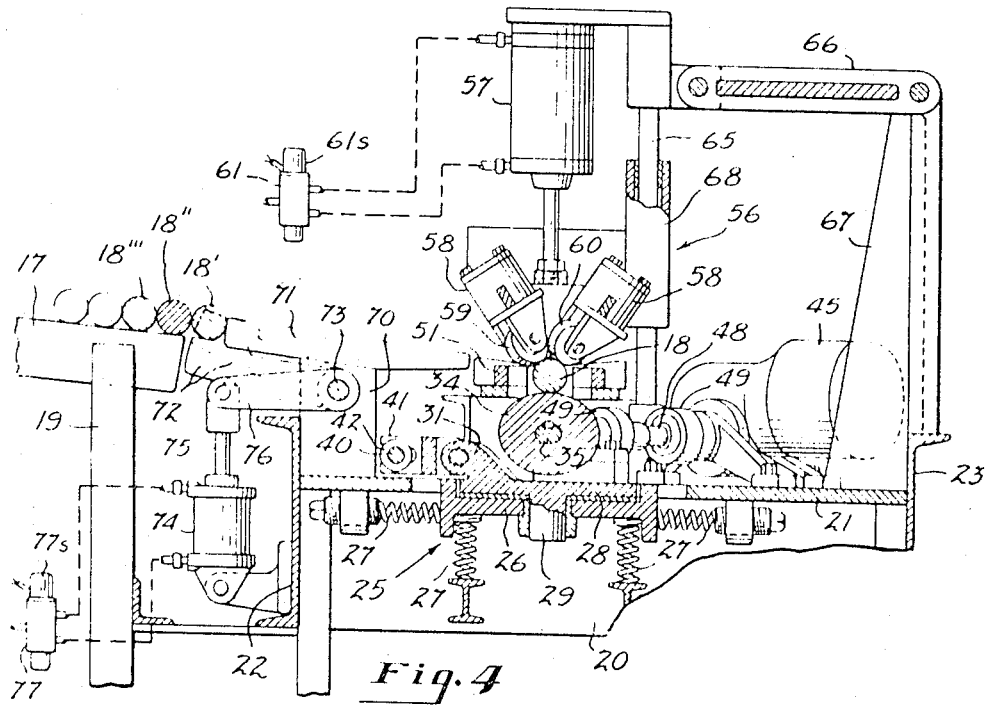
FIGURE 4 is a transverse sectional view of the propelling assembly of FIGURE 3 taken along the line 4—4.

Referring to FIGURE 4, hold-down assemblies 56 are provided over each of the propelling roller assemblies 25 at spaced propelling stations along the entrance section. Each hold-down assembly 56 is carried by the base plate 21 and clamps and holds the workpiece 18 between the guides 51 and against the skewed propelling rollers 34. Each hold-down assembly 56 includes a pneumatic cylinder 57 mounted directly over the line of workpiece travel, a roller mount and support 58 connected to the piston rod of the pneumatic cylinder 57 and a pair of idler rollers 59, 60 carried by each of the mounts 58. A separate solenoid actuated air valve is provided to actuate each of the hold-down cylinders 57. One such solenoid actuated air valve 61 is shown in FIGURE 4.

The hold-down rollers 59, 60 as swiveled in the support 58 and held against the workpiece 18 turn freely and follow the angle of helical movement of the traveling workpiece 18. The axes of rotation of the rollers in the support 58 converge near the center of rotation of the workpiece. Each hold-down cylinder 57 is supported by a pair of support posts 65 and support arms 66. The arms 66 are each pivotally connected at one end to the top of a support post 65 and at the other end to a vertical support plate 67 to accommodate the floating action of their respective float plates 26 on which the support posts 65 are carried. Each hold-down roller mount 58 is connected to tubular guides 68 which are slidable on the support posts 65 and prevent the roller mount 58 from twisting.

A plurality of bridge supports 70 are fixed to the entrance section base plate 21 and are substantially aligned with the inclined rack members 17 of the feed rack assembly 11. Inclined members 71 of the bridge supports 70 are spaced from the ends of the rack members 17 and slant downwardly from just above the rack members 17 to just above the workpiece guides 51 of the entrance section 12. A plurality of workpiece lift arms 72 are fixed to a lift shaft 73 which is rotatably journaled in the bridge support 70. The lift arms 72 bridge the space between the rack members and the inclined bridge members 71. A lift cylinder 74 is secured to the entrance section base 20 and includes a piston rod 75 which is pivotally connected to a lever 76. The lever 76 is fixed to the lift shaft 73 and rotates the shaft 73 when the cylinder is actuated by a control valve 77. The arrangement of the control valve 77 and the lift cylinder 74 is such that when the solenoid 77s of the control valve 77 is electrically energized the lift cylinder 74 is actuated to move the lift arms 72 to their down positions shown in solid in FIGURE 4 and, when the solenoid 77s is de-energized, to raise the lift arms to their up positions shown in phantom.

A plurality of workpiece presence determining limit switches 95 are provided one for each of the hold-down assemblies 56. One limit switch 95 is shown for the hold-down assembly 56 in FIGURE 3. The workpiece presence determining limit switches 95 are fixed to the base 20 of the entrance section and include actuator arms 95a (see arm 95a in FIGURE 3) which extend up between the guide members 51 and are engaged and moved by the workpiece as the workpiece enters the space between the guide members and falls onto the propelling rollers 34. The actuator arms 95a are located ahead of their respective hold-down assemblies 56. Normally open contacts in the workpiece presence determining switches 95 are electrically connected to solenoids 61s of air valves 61 and cause their respective solenoids to be energized when the contacts are closed by a workpiece engaging and moving the actuator arm of that switch. Thus, the hold-down rollers 59, 60 of each hold-down station descends to engage the workpiece only if the workpiece is between the guides at that particular station.

The workpieces 18', 18'', etc., stored on the feed rack members tend to roll because of gravity toward the entrance section 12. The first workpiece 18' in the group of workpieces abuts the end of the inclined bridge members 71 which act as stops. When no workpieces are on the rollers 34 in the entrance section, the lift cylinder 74 rotates the lift arms to lift the workpiece 18' to the inclined bridge member 71. The lifted workpiece 18' rolls by gravity across the guides and onto the propelling rollers 34 moving at least some of the actuator arms 95a and thereby causing the corresponding hold-down rollers to descend and hold the workpiece against the propelling rollers 34. The guide members 51 center the workpiece on the propelling rollers 34 to assure that the idler rollers 59, 60 will properly engage the workpiece. The propelling rollers 34, because of their skew, impart a rotation to the workpiece, as well as propelling it longitudinally through the entrance section. The degree of skew of the rollers 34 determines the amount of lineal travel for each complete revolution of the workpiece. As an example, the skew of the rollers is set to provide three inches of lineal travel per revolution. The units of lineal travel per revolution are therefore adjusted by changing the angle of the rollers 34 by means of the adjusting wheel 43. As the workpiece rotates and travels longitudinally, the swivel mounted hold-down rollers 59, 60 engaging the workpiece align themselves so as to follow the resultant movement of a point on the surface of the helically moving workpiece.

Referring to FIGURES 5 and 7 the inspection station 13 includes two propelling assemblies 25 which are both carried on a single large float plate 88 carried on horizontal and vertical springs 78. A pair of hold-down arms 89 with swiveled rollers 90 are carried by the float plate 88 and are provided over each of the propelling rollers 34 in the inspection station 13. The hold-down arms 89 are pivotally carried by the float plate 88 and include lever arm extensions 91 which are pivoted by the piston rods of cylinders 92. A solenoid actuated control valve 93 is connected to the cylinders 92 and actuates the cylinders to move their respective hold-down rollers against the workpiece when a solenoid 93s of the value 93 is electrically energized.

The float plates 26, 88 are each mounted for independent movement so that workpieces which are bent and cambered may be propelled adjacent to the probe coil. Each hold-down station formed by the propelling and hold-down assemblies 25, 56 and by the hold-down arms 89 with a probe 104 midway between the pairs of arms is carried by a separate float plate and will move in all directions necessary to follow a bend or camber of the workpiece as it travels.

Referring to FIGURES 7–11, an inspection and marking assembly support frame 101 is positioned between the pairs of hold-down arms 89 and is carried by the float plate 88. A probe and marker carriage 102 is slidably carried by the support frame 101 and is vertically adjustable in the support frame 101 by means of a hand crank and screw assembly 103 to accommodate different size workpieces. The search probe 104 is carried by a probe positioning shaft 105 which is attached to the piston rod of a probe positioning cylinder 107. The shaft 105 is vertically movable along its longitudinal axis within guide bushings 106 carried by the carriage 102. A pin 80 protrudes laterally from the shaft 105 and is slidably disposed in a vertically arranged slot 81 in a guide member carried by the carriage 102 to prevent rotation of the shaft 105 regardless of its vertical position.

A gimbal assembly 82 connects the search probe 104 to the end of the shaft 105. The gimbal assembly 82 includes a positioning housing 83 fixed to the end of the shaft 105, an outermost floating housing 84, an intermediate floating housing 85 and an innermost floating housing 86 which contains the search probe 104. The housings 83–86 are partially nested one within the other as is shown. The positioning housing 83 includes triangular portions which overlap portions of the housing 84. Fastener pins 87 are attached to the outermost housing 84 and are slidably disposed within longitudinal slots 87s in the triangular portions of the positioning housing 83 to permit lateral translational movement of the outermost housing 84 relative to the positioning housing 83. The fasteners 87 are in effect projections and the slots 87s are elongated projection receiving openings. The fastener pins 87 as disposed in the slots 87s coact with the slots 87s to define the limits of relative movement between the housings 83, 84. As shown in FIGURE 10, the housing 84 is closely received within the positioning housing 83 so as to prevent relative rotation of the housings 83, 84 while permitting relative lineal movement. Fastener pins 117 interconnect the outermost floating housing 84 and the intermediate floating housing 85 and permit relative rotation of the housings 84, 85 about an axis parallel to the path of workpiece travel. Fastener pins 118 interconnect the intermediate housing 85 and the innermost housing 86 to permit relative rotation of the housings 85, 86 about an axis transverse to the path of workpiece travel and to the axis of relative rotation of the housings 84, 85. The outer side surfaces of the housing 85 which are parallel to the axis of rotation defined by fastener pins 117 are spaced from the adjacent inner surfaces of the housing 84 to permit rotation of the housing 85 within the housing 84. In a like manner, the end surfaces of housing 86 are spaced from adjacent inner surfaces of the housing 85 to permit rotation of the housing 86 in the housing 85. With this gimbal arrangement, the search probe housing 86 is free to move universally at the end of the positioning shaft 105 and will follow the workpiece even though the workpiece should move lateral to its path of travel.

Springs 108, 108' are interposed between the positioning housing 83 and the outermost housing 84 to bias the outermost housing 84 away from the positioning housing 83 and to provide a spring bias to hold the search probe 104 against a moving workpiece. The springs 108, 108' are located one on each side of a vertical plane defined by the pins 87. The universally movable search probe 104 as spring biased toward the workpiece will thus follow the workpiece laterally even though the positioning shaft 105 which carries the probe 104 is fixed against such lateral movement.

A solenoid actuated control valve 109 is pneumatically connected to the cylinder 107 and controls actuation of the cylinder 107. A solenoid 109s of the control valve 109 is connected to a workpiece presence detecting switch 100 carried by the carriage 102. The switch 100 includes an actuator arm 99 which is disposed in the path of workpiece travel. A workpiece entering the inspection station will engage and move the actuator arm 99 and thereby actuates the switch 100. The switch 100 when actuated causes the solenoid 109s to be energized to activate the control valve 109. The activated control valve 109 in turn actuates the positioning cylinder 107 which extends its piston rod to position the search probe 104 against the workpiece which by now is in the inspection station 13. When the workpiece travels completely through the inspection station, the actuator arm 99 is released and the switch 100 opens to de-energize the valve solenoid 109s to cause the positioning cylinder to raise the probe 104 to a position spaced from the path of workpiece travel.

A marker assembly 110 is also carried by the vertically adjustable carriage 102. The marker assembly includes a motor 111 which is pivotally carried by the carriage 102 and a carbide cutter 112 which is fixed to the shaft of the motor 111 and is disposed over the workpiece 18. A spring 113 biases the cutter 112 in spaced relation out of engagement with the workpiece 18. A cylinder 114 is carried by the carriage 102 and has a piston rod connected to a shaft collar 115 at a point just above the cutter 112 and causes the cutter 112 to engage the workpiece each time the cylinder 114 is activated by a suitable control such as a solenoid actuated air valve 116. Suitable control circuits (not shown) are provided in the control center 152 to activate the cylinder 114 each time a defect is detected so that the location of the defect is marked by the cutter 112.

Although only one inspection station 13 is shown, it is to be understood that a plurality of such stations may be provided. For example, a plurality of inspection and marking assemblies may be spaced longitudinally along the path of workpiece travel at the end of the entrance section 12 or they may be spaced along the entrance section 12. With a plurality of longitudinally spaced inspection stations, each station inspects only a portion of each workpiece and all of the assemblies together inspect the entire workpiece.

Referring to FIGURES 1 and 2, the exit section 14 includes a base 121, idler rollers 122 and a pair of drive rollers 123 carried by the base. Exit section drive motors 119 rotate the driver rollers 123 through a suitable drive such as a chain and sprocket drive 120. Exit lift arms 124 are pivotally connected to the base 121 and are operated by a lift cylinder 127 to lift the workpieces off the exit section 14 and roll them into the cradle bin assembly 15 after they have left the inspection station 13.

Referring to FIGURE 1, the cradle assembly 15 includes four bins or cradles A–D formed by upright bin members 135. Inclined members 136 are secured to the tops of the upright members 135 and bridge the upright members between each of the bins A–D. Gate members 137–139 extend across the top of the bins A–C respectively at the sides and middle of the cradle assembly. The gate members 137–139 are fixed to shafts 140–142 respectively and rotate with their respective shafts between a raised and a closed position. The gate members 137–139 in their closed positions are inclined in an overlapping relation with the inclined members 136 and define a continuous inclined rack with them so that workpieces placed on the cradle assembly will move as by rolling along the cradle assembly by gravity and fall into the first bin of the bins A–C that is open or into bin D if none of the gate members 137–139 is raised.

The movement of the gate members 137–139 to open and close the bins A–C is controlled by the control center 152. The control center 152 determines the defect condition of each workpiece inspected and classifies them as either "good," "salvageable" or "scrap." Normally, all of the gates 137–139 are closed.

If a workpiece is classified as "good" then either gate 137 or gate 138 is opened, as preselected, to admit the workpiece into either bin A or bin B. If the workpiece is classified as "salvageable," then gate 139 is opened to admit the workpiece into bin C. If the workpiece is classified as "scrap," then none of the gates 137–139 are opened and the workpiece rolls into the open bin D.

In summary, the present invention is believed to comprise essentially a workpiece propelling and inspecting apparatus including a plurality of propelling assemblies each resiliently mounted to move universally and independently of the other. The propelling assemblies include propelling rollers and the axes of rotation of the rollers are adjustable angularly relative to the longitudinal path of workpiece travel. The rollers rotate the workpiece in addition to propelling it past the inspection probe and the amount of lineal travel per revolution is adjustable. The inspection probe is resiliently biased against a workpiece and is carried by a gimbal assembly so that the probe will follow lateral movement of the workpiece as it moves longitudinally past the inspection probe.

What is claimed is:
1. In a workpiece inspection system, an apparatus for propelling an elongated workpiece longitudinally along a path of travel extending through an inspection station and adjacent an inspection probe in the inspection station, said apparatus comprising:
 (a) an elongated support base having a plurality of longitudinally spaced propelling stations;
 (b) a plurality of roller support tables, one rotatably carried by the support base at each of said propelling stations;
 (c) means supporting the roller support tables for independent floating movement relative to the support base;
 (d) a plurality of propelling rollers, one carried by each of said support tables, each roller as carried by its respective rotatable support table having an axis of rotation which is angularly adjustable relative to a longitudinal path of workpiece travel; and
 (e) adjustment means interposed between said support base and each of said roller support tables for adjustably rotating the support tables relative to the support base whereby adjustment of the adjustment means angularly adjusts the axes of roller rotation relative to the longitudinal path of workpiece travel to thereby adjust workpiece rotation in relation to longitudinal workpiece travel.

2. The apparatus of claim 1 including, in combination:
 (f) a plurality of hold-down assemblies carried by said support base for floating movement with said roller support tables one at each of said propelling stations, and said hold-down assemblies each including a pair of swivelably mounted hold-down rollers positioned to engage the workpiece so as to clamp it against a propelling roller and adapted to swivel and follow the resultant movement of a workpiece rotated and longitudinally propelled by said propelling rollers.

3. In a workpiece inspection system, an apparatus for propelling an elongated workpiece along a longitudinal path of travel extending through an inspection station and adjacent an inspecting probe in the station, said apparatus comprising:
 (a) an elongated support base having a plurality of longitudinally spaced propelling stations;
 (b) a plurality of float plates, one disposed at each of said propelling stations;
 (c) horizontal and vertical spring means interposed between the support base and each of said float plates so that each float plate is substantially universally movable against a resilient bias;
 (d) a plurality of roller support tables, one rotatably carried by each of said float plates;
 (e) a plurality of propelling rollers, one carried by each of said roller support tables so that the axis of rotation of each of said rollers is angularly positionable relative to the support base and to the longitudinal path of workpiece travel, each roller as carried by its rotatable support table is angularly positionable relative to the float plate from a position where its axis of rotation is transverse to the longitudinal path of workpiece travel toward a position of alignment with workpiece travel; and
 (f) an adjustment means operatively interposed between each of said roller support tables and said base support to angularly adjust the positions of the axes of rotation relative to the longitudinal path of workpiece travel whereby a workpiece is propelled and rotated by the rollers, and relative proportions of workpiece propulsion and rotation are determined by the positions of the axes of rotation relative to the path of workpiece travel as set by said adjustment means.

4. The apparatus of claim 3 including, in combination:
(g) a plurality of hold-down assemblies, one carried by each of said float plates, each of said hold-down assemblies including a pair of idler hold-down rollers movable between a workpiece clamping position close to a propelling roller and a workpiece released position substantially spaced from the propelling roller, the hold-down rollers including mounts which are individually swivelable about axes which diverge toward the place of workpiece travel whereby said hold-down rollers are swivelable about their axes of swivel to follow the resultant travel of a workpiece propelled and rotated by the propelling rollers.

5. The apparatus of claim 3 wherein the last two propelling stations along the path of workpiece travel are relatively closely spaced, and an inspection probe is positioned between the last two propelling stations.

6. The apparatus of claim 3 including, in combination:
(g) a plurality of driving motors carried by said support base, one adjacent each of said propelling stations; and,
(h) a plurality of extensible drive shafts interconnecting said propelling rollers and said drive motors.

7. The combination of claim 3 wherein said adjustment means is interconnected with all of the rotatable roller support tables to simultaneously adjust the angles of the axes of rotation of the rollers relative to the path of workpiece travel.

8. An inspection apparatus for inspecting elongated workpieces, said apparatus comprising:
(a) an elongated support base having a plurality of propelling stations longitudinally spaced along the support base, and an inspection station at one end of the support base;
(b) a plurality of roller support tables, one rotatably carried by the support base at each of said propelling stations;
(c) means interposed between the support base and the roller support tables to permit floating movement of the tables relative to the base;
(d) a plurality of propelling rollers, one carried by each of said support tables, each roller as carried by its respective rotatable support table having an axis of rotation which is angularly adjustable relative to a longitudinal path of workpiece travel;
(e) adjustment means interposed between said support base and each of said roller support tables for adjustably rotating the support table relative to the support base whereby adjustment of the adjustment means angularly adjusts the axes of roller rotation relative to the longitudinal path of workpiece travel to thereby adjust workpiece rotation in relation to longitudinal workpiece travel;
(f) an inspection probe apparatus floatingly carried by said support base within the inspection station for positioning and maintaining a pick-up coil in adjacent relation to a workpiece longitudinally propelled and rotated by said propelling rollers; and,
(g) said inspection probe apparatus comprising:
(i) an innermost housing containing the pick-up coil and including workpiece surface engaging means for engaging the surface of the workpiece and maintaining the coil in said adjacent relation to the workpiece;
(ii) an intermediate housing at least partially receiving the innermost housing;
(iii) an outermost housing at least partially receiving the intermediate housing;
(iv) first connection means rotatably connecting said innermost housing to said intermediate housing for relative rotation of the innermost and intermediate housings about a first axis of rotation;
(v) second connection means rotatably connecting said intermediate housing to said outermost housing for relative rotation of said intermediate and outermost housings about a second axis of rotation;
(vi) said first axis of rotation being transverse to said second axis of rotation;
(vii) a positioning housing movably mounted on said support base so as to be laterally movable toward and away from the path of workpiece travel;
(viii) said positioning and outermost housings including overlapping portions, one of said latter two housings including a projection and the other of said latter two housings including elongated, projection receiving openings for receiving said projections, said projections and said projection receiving openings coacting to permit limited movement of said outermost housing relative to said positioning housing laterally toward and away from the path of workpiece travel between fixed limits defined by ends of the elongated projection receiving openings; and,
(ix) resilient means interposed between said positioning and outermost housings and resiliently biasing said outermost housing toward the path of workpiece travel.

9. In a workpiece inspection system, an apparatus for propelling an elongated workpiece along a path of travel extending through an inspection station and adjacent on inspection probe in the inspection station, said apparatus comprising:
(a) an elongated support base having a plurality of longitudinally spaced propelling stations;
(b) a plurality of workpiece propellers, one located at each of said propelling stations and arranged in substantially longitudinal alignment with the other propellers, each propeller comprising:
(i) a float plate carried by the yieldable suspension means,
(ii) a roller table plate rotatably carried by the float plate,
(iii) a driven roller carried by the roller table so that rotation of the roller table changes the angle between the axis of rotation of the roller and the longitudinal path of travel of the workpiece and,
(iv) adjustment means connected to each of said roller table plates for adjusting the angle between the axes of rotation of the rollers and the longitudinal path of workpiece travel; and,
(c) yieldable suspension means interposed between said support base and each of said propellers at each of said propelling stations, said yieldable suspension means at one propelling station being independent of the yieldable suspension means at the other propelling stations so that each propeller is independently movable relative to said support base and relative to the other propellers.

10. In a workpiece inspection system, propelling and inspection apparatus comprising:
(a) a plurality of longitudinally spaced propelling stations including base support structure, driven workpiece propellers in substantial longitudinal alignment to define a path of workpiece travel, and a yieldable suspension on the base support structure and supporting the propellers;
(b) said propellers each including a roller rotatable about an axis skewed with respect to the path of workpiece travel, separate drive means to rotate each roller, means to adjust the skewed relationship with respect to the path of workpiece travel, and an idling hold-down roll to maintain a workpiece in contact with the roller;

(c) a workpiece inspection probe along said path of workpiece travel supported by a yieldable suspension common to a driven workpiece propeller, supporting a sensing device adjacent the path of workpiece travel, and including means to bias the sensing device against the surface of a propelled workpiece; and, (d) each said suspension at each spaced propelling station being independently yieldable relative to the suspensions at other propelling stations so that the propellers at each station are independently movable relative to the base support structure and relative to the propellers at other propelling stations.

11. In a workpiece inspection system, workpiece propelling and inspection apparatus including: a stationary support; drive rolls spaced along the stationary support for carrying, rotating and advancing an elongated workpiece along a path, each drive roll being rotatable about an axis skewed with respect to said path; power means connected to said rolls to rotatably drive each roll about said skewed axis; a yieldable suspension interposed between the stationary support and the drive rolls connecting the drive rolls and the support; means to urge the workpiece against the drive rolls so that the rolls follow the workpiece contour; an inspection probe located between said spaced drive rolls along said path and commonly supported with said rolls by said yieldable suspension for movement with said rolls relative to the support; and a defect sensing device flexibly supported by said probe to follow variations in the surface contour of the workpiece.

References Cited
UNITED STATES PATENTS

| | | |
|---|---|---|
| 2,264,725 | 12/1941 | Shoupp et al. |
| 2,353,211 | 7/1944 | Zuschlag _____ 324—40 |
| 2,878,447 | 3/1959 | Price et al. _____ 324—37 |
| 3,066,254 | 11/1962 | Price et al. _____ 324—37 |
| 3,074,605 | 1/1963 | Shaw _____ 214—339 |
| 3,170,114 | 2/1965 | Placke _____ 324—37 |
| 3,299,350 | 1/1967 | Tompkins et al. _____ 324—37 |
| 3,299,349 | 1/1967 | Tompkins et al. _____ 324—37 |
| 1,743,223 | 1/1930 | Lowy. |
| 1,887,434 | 11/1932 | Sammis _____ 198—127 |

RUDOLPH V. ROLINEC, *Primary Examiner.*

R. J. CORCORAN, *Assistant Examiner.*

U.S. Cl. X.R.

198—127; 214—338